June 6, 1967 A. A. BRACCINI 3,323,820
SPACE FRAME STRUCTURES
Filed April 19, 1965 2 Sheets-Sheet 1

INVENTOR.
ALFONSO A. BRACCINI
BY Fraser and Bogucki
ATTORNEYS

June 6, 1967    A. A. BRACCINI    3,323,820
SPACE FRAME STRUCTURES

Filed April 19, 1965    2 Sheets-Sheet 2

INVENTOR.
ALFONSO A. BRACCINI
BY
Fraser and Bogucki
ATTORNEYS

United States Patent Office 3,323,820
Patented June 6, 1967

3,323,820
SPACE FRAME STRUCTURES
Alfonso A. Braccini, La Mesa, Calif., assignor to Whittaker Corporation, a corporation of California
Filed Apr. 19, 1965, Ser. No. 449,075
9 Claims. (Cl. 287—189.36)

This invention relates to space frame assemblies, and more particularly to devices for joining together individual beams and sections of a generally spherical shell type structure having a covering membrane supported upon a ribbed frame.

Recent advances in building materials and techniques have resulted in the increasing use of space frame structures having a supporting frame of rib or beam members together with a membrane covering. A space frame structure is free of internal and external support other than the base upon which it may be mounted, so that the entire interior is useful space. Furthermore, because of the interdependence between the separate beams, this type of construction has extremely high strength for the weight of structural elements employed. Particular forms of such structures, often called "geodesic" structures, are found to be particularly appropriate for large exhibit halls or auditoriums, and for electromagnetically transparent housing (radomes) for antenna systems.

For strength and rigidity, as well as ease of assembly, the individual beams of the structure are usually grouped together in selected geometries, such as triangles, with the joining apexes of the triangles being coupled together and held by hubs. Other polygonal geometries such as pentagons and hexagons are also sometimes used. The space frame geometry need not of course be spheroidal, but may include ellipsoidal and oblate deformations of a sphere, as well as non-spheroidal shapes. Space frame assemblies, whether spheroidal or not, usually employ a number of variations of the basic geometrical element. A number of variations of a triangle may be used, for example. Consequently, many different hub types may be required to fasten the beams together at the intersection points. Although attempts at standardization of the geometrical units have been made, it is usually preferable to accept a certain minimum number of variations of the basic geometrical form, and to accommodate the variations by using a number of different hub types. For some applications, as with a randome, the number of geometric variations of a triangle are often increased to achieve randomness in the beam pattern in order to avoid disruption of the antenna radiation pattern.

It is therefore desirable to provide a hub for space frame structures which can be utilized for each point of intersection, irrespective of the number of or the angles between the beams coming together at an intersection region. The hub must also, however, have a strength compatible with the remainder of the system and provide suitable interlock rigidity. Further, these objectives must be achieved without requiring special modifications or configurations for the associated frame beams.

It is therefore an object of the present invention to provide improved interlocking elements for a space frame structure.

Another object of the present invention is to provide high strength, easily installed and low cost universal joinder devices for space frame assemblies.

Yet another object of the present invention is to provide an improved joinder device capable of coupling together a variable number of beams in a space frame structure.

Yet a further object of the present invention is to allow replacement of panels without disturbing the hub or structure.

These and other objects of the invention are achieved by structures utilizing several plates, two of which form the inner and outer retention members for the beams, and include means for longitudinal and transverse restraint of the beams irrespective of the angular relation of the beams, and the third of which provides a resilient retaining member for securing the conforming membrane panels to the hub.

In accordance with one aspect of the invention, the hub design includes a race plate including a circular key on one side of the beams to be joined together, a base plate engaging the opposite side of the beams and clamping them against the race plate, and a washer clamping and sealing the membrane panels into the assembly. A variably configured indexing ring in the form of a section of tubing fits into circular grooves in the base and race plates and includes slots to receive and index the beams in their proper angular relationships for that particular hub. With this construction, only a single bolt is needed for the entire hub, and the membrane panels may be independently removed. Further, all assembly and disassembly may be accomplished from outside the space frame structure.

In accordance with another aspect of the invention, an alternate configuration is provided utilizing a race plate having a circular raceway, a base plate and a circular washer plate, the circular washer plate serving as before to sealably secure the membrane panels to the hub. The circular raceway of the race plate receives separate key members into which each space frame beam is set, and includes small slots for indexing the key members to their proper relative angular positions. Hubs in accordance with this aspect of the invention may also be assembled and disassembled from outside the radome, but in addition are made in such fashion that the individual parts may be manufactured by low cost casting techniques.

A better understanding of the invention may be had by reference to the following description, taken in conjunction with the accompanying drawings, in which.

Figure 1:
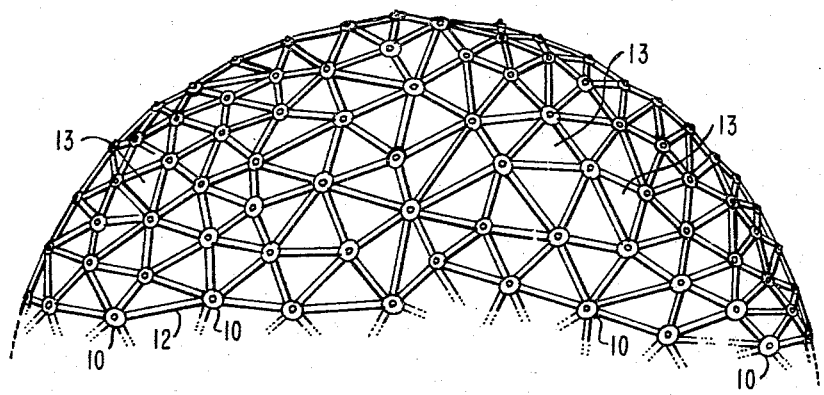
FIG. 1 is a perspective view, partially broken away, of a space frame structure, showing the manner in which beams are joined by hubs at intersection points.

The general arrangement of a space frame structure is shown in fragmentary form in FIG. 1, in which a portion of a spheroidal structure is illustrated. Individual beams 12 joined together at their ends at hub 10 points define triangular surface areas which are relatively small compared to the total surface area. A large volume is encompassed by this many-sided structure, even though the beams 12 are all short, and each is of some standard length. The covering membranes 13 usually are in the form of a plurality of triangular panels, each like, and positioned to register with a different triangle defined by the beams.

Figure 4:
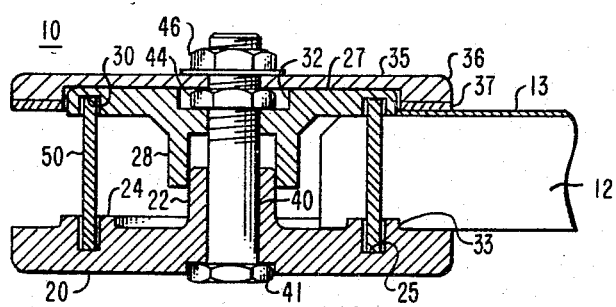
FIG. 4 is a side sectional view, of the hub of FIG. 2.
Figure 3:
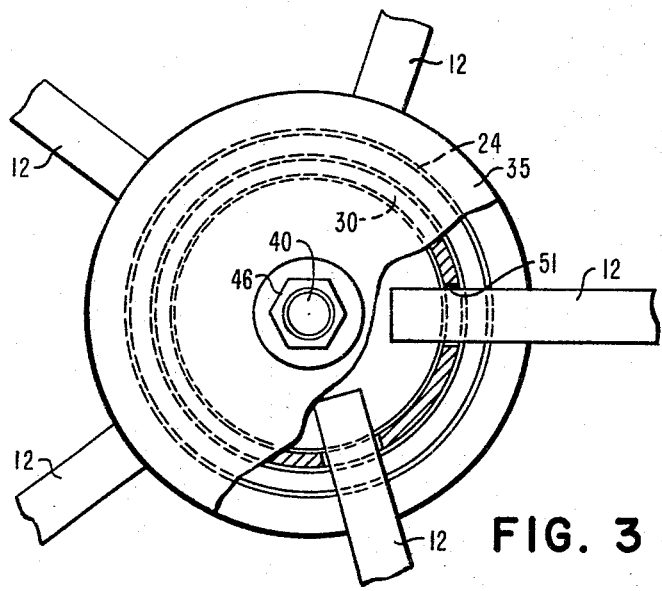
FIG. 3 is a plan view, partially broken away, of the hub arrangement of FIG. 2.
Figure 2:
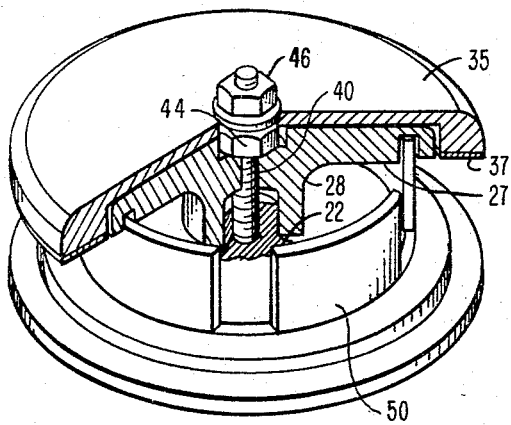
FIG. 2 is a perspective view, partially broken away, of a hub in accordance with the invention.

An example of one form of hub or joinder mechanism for use in space frame structures in accordance with the invention is shown in FIGS. 2–4, to which reference is now made. The hub 10 is arranged to receive, retain and interlock the beams 12 and panels 13 of the space frame construction. Dependent upon the overall space frame design, there is a given pattern of intersection of the various beams 12 at an individual hub 10. That is, the axes of the beams 12 intersect at a given central axis with varying but standard angular relationships, and with differing numbers of beams. Typically, from three to eight beams intersect at each hub. Hub structures in accordance with this aspect of the invention acommodate these differences, with variations of only one readily fabricated part.

The hub 10 principally comprises a race plate 20 having a central aperture within a central boss 22, and also a circular raceway 24 including a circumferential groove 25, with both the raceway 24 and the groove 25 being concentric with the central axis of the hub 10. The central aperture is also concentric with the central axis of the hub, and the protruding central boss 22 of the race plate 20 is disposed to face an opposed base plate 27 and to engage and mate with a sliding fit within a central boss 28 in the base plate 27. The base plate 27 also includes a central aperture concentric with the central axis of the hub 10. In addition, a circumferential groove 30 having a radius corresponding to the groove 25 in the race plate 20 is disposed on the face of the base plate 27.

In the assembly of the hub 10, the race plate 20 is disposed on the interior side of the space frame, as best seen in FIG. 4. The interior face of the race plate 20 includes a surface recess for receiving the head of a central bolt, to be described. A surface recess 32 is also included in the outer face of the base plate 27 to receive a locking nut for the central bolt. Space frame beams 12 inserted into this hub structure include, on their interior surface relative to the space frame assembly, a transverse notch 33 configured to mate with the raceway 24 in the race plate 20. On the outside of the hub 10, a circular cover plate 35 is disposed adjacent the base plate 27 and includes an outer flange 36 to which a resilient gasket or annular resilient member 37 may be affixed as by bonding or some other conventional technique. The gasket 37 is in engagement with the space frame panels 13, mechanically forcing the panels 13 against the adjacent beams 12 and providing a weather tight circumferential seal about the hub 10. A central bolt 40 passes through the central apertures of the race plate 20, the base plate 27, and the cover plate 35, with the head 41 of the bolt 40 resting within the surface recess of the race plate 20. An internal nut 44 seated within the recess 32 on the base plate 27 is tightened on the bolt 40 to urge the race plate 20 and base plate 27 together. The ends of the beams 12 are gripped within the plates 20, 27 as the unit is tightened. An external nut 46 is threaded on the bolt 40 on the exterior side of the cover plate 35 to force the cover plate 35 in position and to compress the resilient gasket 37 against the panels 13.

The raceway 24 seats wthin the beam notches 33 to restrain the beams 12 from longitudinal movement. Restraint against transverse movement is provided by an indexing ring 50 which is the only selectively variable part within the hub 10. The indexing ring 50 includes partial lonigtudinal slots 51 corresponding in width to the beams 12 so as to receive the beams 12 with a tight fit. The angular disposition of the slots 51 are varied for a given indexing ring 50, dependent upon the number and angular relationship of the beams 12 which are to intersect at the particular hub 10. The indexing ring 50 is preferably made from standard tubular material, the slots 51 being cut to a selected depth by conventional techniques from a tube of chosen length.

In the construction of the space frame assembly, the hubs may be entirely assembled and the beams 12 and panels 13 may be interlocked from the outside of the structure. The bolt 40 is held extended out through the central aperture of the race plate 20, as the race plate 20 is fitted under the intersecting beams at the central axis of the hub 10, with the selected indexing ring 50 placed in position within the circular groove 25 in the race plate 20. The base plate 27 is then added externally, and the internal nut 44 added to secure the base plate 27 to the race plate 20, securing the beams 12 in position. The panels 13 are then placed on the outer surfaces of the beams 12, and the cover plate 35 is added. Finally, the weather-tight seal is completed by tightening down the external nut 46.

Figure 5:
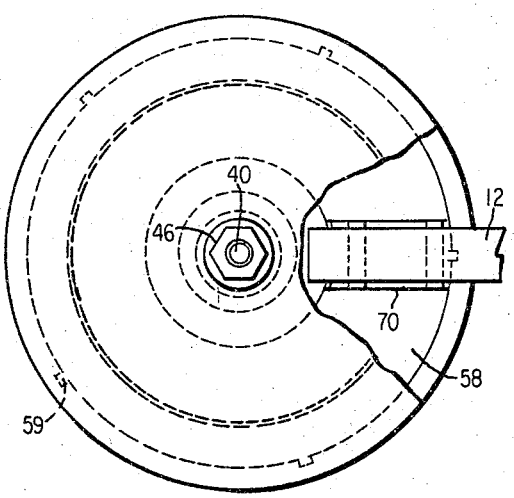
FIG. 5 is a plan view of a second form of hub for space frame structures in accordance with the invention.
Figure 6:
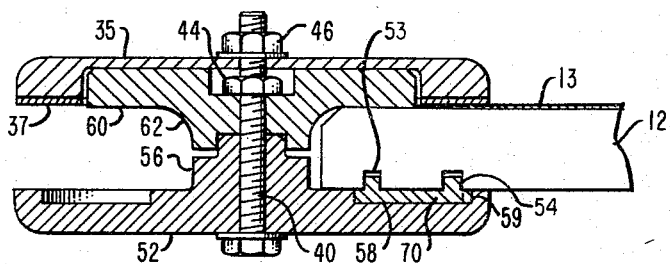
FIG. 6 is a side sectional view of the hub of FIG. 5.
Figure 7:
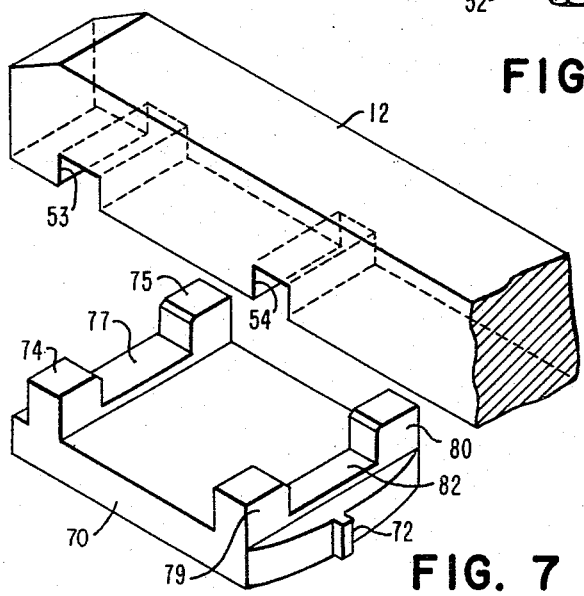
FIG. 7 is an exploded perspective view of a portion of the arrangement of FIG. 5.

A different form of universal hub in accordance with the invention is shown by the mechanism illustrated in FIGS. 5 through 7 respectively. In this arrangement, a race plate 52 and a base plate 60 are used which are particularly suited for fabrication by investment casting techniques. The space frame beams 12 in this configuration include a pair of transverse notches 53, 54, (best seen in FIG. 7) on their internal faces relative to the space frame structure. The race plate 52 has a central boss 56 and a central aperture, disposed as previously described concentric with the central axis of the hub 10. The central boss 56 engages a central boss 62 of the base plate 60, but the face of the race plate 52 which opposes the base plate 60 does not include a raceway as previously described, but a circumferential groove 58, in the outer periphery of which are disposed a plurality of circumferentially spaced coded slots 59. A cover plate 35 and a resilient gasket 37, together with a central bolt 40 and the internal and external nuts 44, 46 are arranged similarly to the arrangement of FIGS. 2–4, and are designated by corresponding numerals.

Transverse and longitudinal retention of each of the space frame beams 12 is effected by key beam lock members 70 (best seen in FIGS. 6 and 7) which are seated at differing circumferential points within the groove 58 of the race plate 52. Each beam lock members 70 includes an indexing key 72 which is fitted within any selected one of the coded slots 59 in the outer periphery of the groove 58 in the race plate 52. When in this position, the beam lock member 70 presents two pairs of upwardly facing lugs 74, 75 and 79, 80 at different radii relative to the race plate 52. An inner pair of lugs 74, 75 are joined by a ridge 77 which extends transversely relative to the beam 12, and the outer pair of lugs 79, 80 are similarly joined by a ridge 82. These transverse ridges 77, 82 register within the notches 53, 54 in the beam 12 with a sliding fit. The lug pairs 74, 75 and 79, 80 rest on each side of the beam 12 and also mate with a sliding fit. Thus, the ridges 77, 82 provide the desired longitudinal restraint relative to the beams 12, whereas the lug pairs 74, 75 and 79, 80 provide the desired transverse restraint.

The mechanism of FIGS. 5–7 retains the advantages of the construction of FIGS. 2–4, in that the entire assembly may be erected and disassembled from outside the space frame structure, and in that structure is variable to receive any feasible number and angular position of the entering beams 12. In addition, the assembly also provides a weather-tight seal and firm engagement of the external membrane of the space frame.

While there have been described above and illustrated in the drawings various forms of universal hubs for space frame structures, it will be appreciated that the invention is not limited thereto, but includes all alternative forms and variations falling within the scope of the appended claims.

What is claimed is:

1. A hub for joining together beams, each having an engageable transverse portion adjacent the ends thereof, and external panels meeting in the region of a central hub axis in a space frame structure, comprising: a pair of plate means disposed on opposite sides of the beams in the region of the given hub axis, each of the plate means including central apertures therein about the given hub axis; means disposed between the pair of plate means for longitudinally and transversely restraining the beams, said means including a portion concentrically disposed about the central hub axis for engaging the transverse portion adjacent the beam ends to restrain longitudinal movement of the beams in a direction radial to the hub axis and means extending between said plate means and selectively disposable about said hub axis between adjacent beam ends to restrain transverse movement of said beams; central bolt means fitting through the central apertures in the plate means for mechanically clamping the beams and the restraining means in engagement with one another between the plate means; and means coupled to the central bolt means for sealably engaging the external panels to the beams outside the plate means.

2. A hub for joining together beams and external panels meeting at a central hub axis in a space frame structure, the beams including transverse end notches, comprising: a pair of plate means disposed on opposite sides of the beams meeting at the given hub axis, the plate means including central apertures therein; means disposed between the pair of plate means for longitudinally and transversely restraining the ends of the beams, said means including first means concentric with the central hub axis coupled to at least one of said plate means and extending toward the other plate means for engaging the end notches to restrain longitudinal movement of each beam and second means concentric with the central hub axis extending between said pair of plate means and selectively disposable about said central hub axis between adjacent beam ends to restrain transverse movement of said beam ends; central bolt means fitting through the central apertures in the plate means for urging the plate means together to interlock the restraining means with the ends of the beams; and means, including a resilient annular member exterior to the panels coupled to the central bolt means for externally sealing the hub.

3. A universal hub for space frame structures having a varying number of beams coming together at various angular relations to a central axis, each of the beams having a transverse notched portion on at least one side adjacent the end thereof, the hub including the combination of a first plate concentric with the central axis and disposed adjacent the inner side of the beams, a second plate concentric with the central axis and adjacent the outer side of the beams, and means disposed concentrically about the central axis for mechanically restraining the beam ends from longitudinal and transverse movement, said means including first means disposed concentrically about said central axis coupled to at least one of said plates and extending toward the other plate for engaging the notched portion adjacent the end of each beam to restrain longitudinal movement thereof and second means selectively disposed concentrically about said central axis between adjacent beam ends and extending between said plates to restrain transverse movement of said beams.

4. The invention as set forth in claim 3 above, wherein said second means comprises an indexing ring including selectively disposed apertures for receiving the beams, the first and second plates having circular grooves therein concentric with the central axis for receiving the opposite ends of said indexing ring, and wherein said first means includes a concentric raceway formed on the first plate for engaging the notched portions in the beam ends.

5. The invention as set forth in claim 3 above, wherein said restraining means comprises key lock members engaging the first plate at various angular positions thereabout and said first means includes transverse ridged means engaging the notched portions of the beam ends for restraining the beams from longitudinal movement, and said second means includes lug means spaced apart to receive the beam width, to provide transverse restraint of the beam.

6. A universal hub for space frame structures having varying numbers of beams including end notches and coming together at differing angles relative to a hub central axis and including the combination of a race plate on the inner side of the beams at the central axis, a base plate on the outer side of the beams at the central axis, the race plate and base plate including mating central boss members having central apertures and further including facing circular grooves, the race plate also including a circular key configured to register within the end notches in the beams, and an indexing ring disposed between the race plate and base plate and dimensioned to seat within the facing grooves therein, the indexing ring including apertures for receiving the beams, the circumferential portions of the apertures being varied in accordance with the number and angular dispositions of the intersecting beams at the hub.

7. A device for fixedly coupling together at an intersection point the adjacent ends of beam members which together form a part of a space frame structure also having an external membrane, each of the beam members including a notched portion adjacent to an end thereof, the device including a circular race plate member having a circular key on one face thereof, a circular groove therein and a central boss member, the race plate member also including a central aperture within the boss member, a base plate member including a circular groove therein and a central boss member, the boss member including a central aperture, the circular groove of the base plate member having a radius corresponding to that of the groove in the race plate member, and the central boss member of the base plate member being dimensioned and shaped to mate with and be slidably retained with the central boss member in the race plate member, the circular key in the race plate member being configured to engage the notches of the beam members with a sliding fit to restrain the beam member from longitudinal movement, a central indexing ring positioned between the base plate and race plate members and engaging within the circular grooves in the base plate and race plate members, the indexing ring including longitudinal slots at different circumferential positions thereabout, each extending along a portion of the length thereof, the longitudinal slots receiving the beam members and restraining the beam members from transverse movement, central bolt means engaging the base plate to the race plate members through the central apertures therein, annular resilient washer means encompassing the base plate on the outer side of the external membrane, and cover plate means coupled to the central bolt means and engaging the annular washer mean, to maintain the washer means against the external membrane.

8. A universal hub for space frame constructions, for firmly restraining ends of a variable number of beams having differing angular relations to the hub central axis, and also restraining space frame panels positioned on external faces of the beams, the beams including end notches in internal faces thereof, the combination comprising base plate and race plate means each having a central aperture and a boss portion, the boss portions of the base plate and race plate means fitting in mating relation about the central axis of the hub, the base plate and race plate means disposed in facing relation, means disposed on the race plate means for defining a circular key means engaging the end notches of the beams and limiting longitudinal movement thereof, means engaging the race plate means and the beams, and including circumferentially spaced surfaces for restraining the ends of the beams from transverse movement, resilient annular means disposed about the base plate means and engaging the space frame panels thereat, cover plate means adjacent the base plate means and including a central aperture concentric with the central axis of the hub, the cover plate means engaging the annular means, and central bolt means engaging the base plate means to the race plate means and urging the cover plate means in the direction toward the interior of the space frame thereby to force the annular means against the panels and engage the beams and panels between the base plate means and race plate means.

9. A universal hub device for space frame structures for retention of variable numbers of space frame beam members and panels coming together at variable angles at a given hub point, the hub structure including a circular base plate having a central boss and a central aperture, a circular race plate having a central boss and a central aperture, the central boss of the race plate engaging in and mating with the central boss of the base plate, the race plate also including a circumferential groove in facing relation to the base plate, the circumferential groove including coded slots in the outer periphery thereof at spaced circumferential points, a number of key beam lock members, each disposed within the circumferential groove of the race plate, and each including radial and circumferentially spaced lugs engaging notches in the ends of inserted beam members to provide restraint against transverse and longitudinal movement, the beam lock members including indexing keys mating with selected individual ones of the coded slots, central bolt means disposed through the central apertures of the race plate and base plate and providing mechanical connection thereof and engagement of the included beam members, and cover plate means disposed adjacent the base plate and coupled to a central portion thereof, the cover plate means including resilient gasket means disposed on the outer side of the panels for urging the panels against the beam members.

References Cited
UNITED STATES PATENTS

| | | | |
|---|---|---|---|
| 2,682,235 | 6/1954 | Fuller | 287—189.36 X |
| 2,813,310 | 11/1957 | Harrison | 287—189.36 X |
| 3,192,669 | 7/1965 | Hawkins | 52—81 |

REINALDO P. MACHADO, *Primary Examiner.*

HARRISON R. MOSELEY, *Examiner.*

P. M. CAUN, *Assistant Examiner.*